United States Patent
Wang et al.

(10) Patent No.: US 11,716,041 B2
(45) Date of Patent: Aug. 1, 2023

(54) MOTOR CONTROL APPARATUS AND METHOD OF OPERATING THE SAME

(71) Applicant: DELTA ELECTRONICS, INC., Taoyuan (TW)

(72) Inventors: Te-Wei Wang, Taoyuan (TW); Yi-Kai Peng, Taoyuan (TW); Chen-Yeh Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/356,857

(22) Filed: Jun. 24, 2021

(65) Prior Publication Data
US 2022/0077805 A1   Mar. 10, 2022

Related U.S. Application Data

(60) Provisional application No. 63/076,591, filed on Sep. 10, 2020.

(51) Int. Cl.
*H02P 27/06* (2006.01)
*H02P 3/18* (2006.01)
*H02M 7/5387* (2007.01)
*H02P 29/024* (2016.01)

(52) U.S. Cl.
CPC ........ *H02P 27/06* (2013.01); *H02M 7/53871* (2013.01); *H02P 3/18* (2013.01); *H02P 29/025* (2013.01); *H02P 2207/05* (2013.01)

(58) Field of Classification Search
CPC ...... H02M 7/53871; H02P 27/06; H02P 3/18; H02P 2207/05; H02P 3/22; H02P 29/025
See application file for complete search history.

(56) References Cited

U.S. PATENT DOCUMENTS

| | | | | |
|---|---|---|---|---|
| 5,291,106 A | * | 3/1994 | Murty | ............ H02P 6/24 318/370 |
| 7,170,245 B2 | * | 1/2007 | Youm | ............ H02P 3/22 318/362 |
| 7,882,937 B2 | * | 2/2011 | Okada | ............ B66B 1/308 187/296 |
| 9,178,448 B2 | * | 11/2015 | Ogawa | ............ H02P 3/22 |

(Continued)

FOREIGN PATENT DOCUMENTS

DE    3929407 A1    3/1991
EP    3223592 A2    9/2017

OTHER PUBLICATIONS

Taiwan office action dated Apr. 22, 2022 of Taiwan patent application No. 110126208.

*Primary Examiner* — Thai T Dinh
(74) *Attorney, Agent, or Firm* — Muncy, Geissler, Olds & Lowe, P.C.

(57) ABSTRACT

A motor control apparatus receives a DC power source through a DC terminal and is coupled to a motor. The motor control apparatus includes a brake, an inverter, and a controller. The brake is coupled to the inverter. The brake includes an energy-consuming component and a switch component. The controller controls the inverter to convert the DC power source to drive the motor. When the controller determines that the DC power source is interrupted, the controller stops controlling the inverter, and the switch component is self-driven turned on so that a back electromotive force generated by the motor is consumed through the energy-consuming component.

8 Claims, 8 Drawing Sheets

(56) References Cited

U.S. PATENT DOCUMENTS

| | | | |
|---|---|---|---|
| 9,975,433 B2* | 5/2018 | Fujiwara | B60L 15/22 |
| 10,250,160 B2* | 4/2019 | Jalili | G05F 1/67 |
| 11,038,402 B2* | 6/2021 | Gurr | H05K 1/167 |
| 2009/0058333 A1* | 3/2009 | Okada | B66B 1/308 |
| | | | 318/380 |
| 2017/0271952 A1 | 9/2017 | Gurr et al. | |
| 2018/0115255 A1* | 4/2018 | Jalili | H02M 7/537 |

* cited by examiner

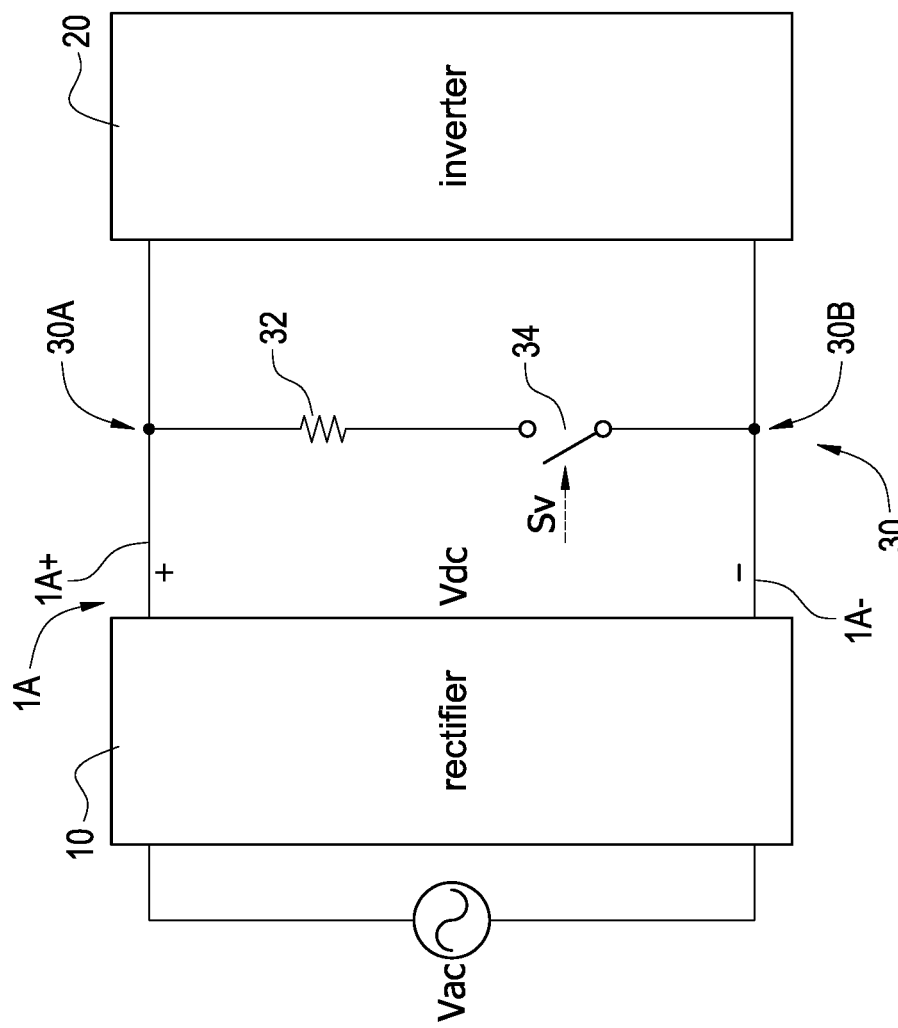

MOTOR CONTROL APPARATUS AND METHOD OF OPERATING THE SAME

CROSS-REFERENCE TO RELATED APPLICATION

This patent application claims the benefit of U.S. Provisional Patent Application No. 63/076,591, filed Sep. 10, 2020, which is incorporated by reference herein.

BACKGROUND

Technical Field

The present disclosure relates to a motor control apparatus and a method of operating the same, and more particularly to a motor control apparatus with a brake function and a method of operating the same.

Description of Related Art

The statements in this section merely provide background information related to the present disclosure and do not necessarily constitute prior art.

Nowadays, a motor control apparatus (such as an elevator) with displacement driven by a motor is usually controlled by one or more electromagnetic brakes in power failure braking technology. When the AC mains is interrupted (failed), the motor bearing is tightly clamped by a spring to avoid the belt or cable from sliding. When the AC mains normally supplies power, one or more electromagnetic brakes are energized to release the clamping force to make the motor work. That is, the electromagnetic brake makes the motor control apparatus work, and the return of the spring makes the motor control apparatus stop.

This design can ensure that the motor is locked to avoid sliding when the power electricity is interrupted. In some applications of motor control apparatuses (for example but not limited to, treadmills, escalators, etc.), however, the running belt is usually allowed to slide slightly (resistance is required) when the power electricity is interrupted in order to avoid that when someone is trapped, the running belt is bitten and cannot get out of the trap by himself. Therefore, the circuit structure and control manner of motor control apparatuses used in elevators are not suitable for treadmills, escalators, and other similar equipment. Moreover, the mechanical brake apparatus of the motor control apparatus used in the elevator requires regular maintenance, which will inevitably increase the burden on the user. Generally, the mechanical brake apparatus has a high cost and needs to be installed in a small treadmill control box, which makes it impossible to reduce construction costs and miniaturization.

In addition, when the input power source is interrupted, since the controller inside the motor control apparatus will also fail due to the interrupted power electricity, the controller fails to control the brake of the motor if there is no additional power source (such as a battery).

Accordingly, the present disclosure provides a motor control apparatus and a method of operating the same to use the self-driven brake function to replace the mechanical clamping brake manner of the mechanical brake apparatus.

SUMMARY

In order to solve the above-mentioned problems, the present disclosure provides a motor control apparatus. The motor control apparatus receives a DC power source through a DC terminal and is coupled to a motor. The motor control apparatus includes a brake, an inverter, and a controller. The brake includes an energy-consuming component, a switch component, a first end, and a second end. The first end is coupled to a high-voltage terminal of the DC terminal, and the second end is coupled to a low-voltage terminal of the DC terminal. The energy-consuming component is coupled between the first end and the second end through the switch component. The inverter is coupled to the first end and the second end. The controller is coupled to the DC terminal, and controls the inverter to convert the DC power source to drive the motor. When the controller determines that the DC power source is interrupted, the controller stops controlling the inverter and the switch component is self-driven turned on so that a back electromotive force generated by the motor is consumed through the energy-consuming component.

In order to solve the above-mentioned problems, the present disclosure provides a method of operating a motor control apparatus. The motor control apparatus receives a DC power source through a DC terminal and is coupled to a motor. The motor control apparatus includes a brake and an inverter. The brake includes an energy-consuming component and a switch component coupled between a high-voltage terminal and a low-voltage terminal of the DC terminal. The method includes steps of: controlling the inverter to convert the DC power source into an output power source to drive the motor, determining whether the DC power source is interrupted to decide whether to stop controlling the inverter, stopping controlling the inverter when the DC power source is interrupted, and self-driven turning on the switch component when the DC power source is interrupted so that a back electromotive force generated by the motor is consumed through the energy-consuming component.

The main purpose and effect of the present disclosure is to use characteristics of the permanent magnet motor and the self-driven brake to generate the braking force so as to replace the mechanical brake apparatus, reduce the maintenance cost, and increase the flexibility of the mechanism design.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows:

FIG. 2D is a block diagram of the brake according to a fourth embodiment of the present disclosure.

DETAILED DESCRIPTION

Figure 1:
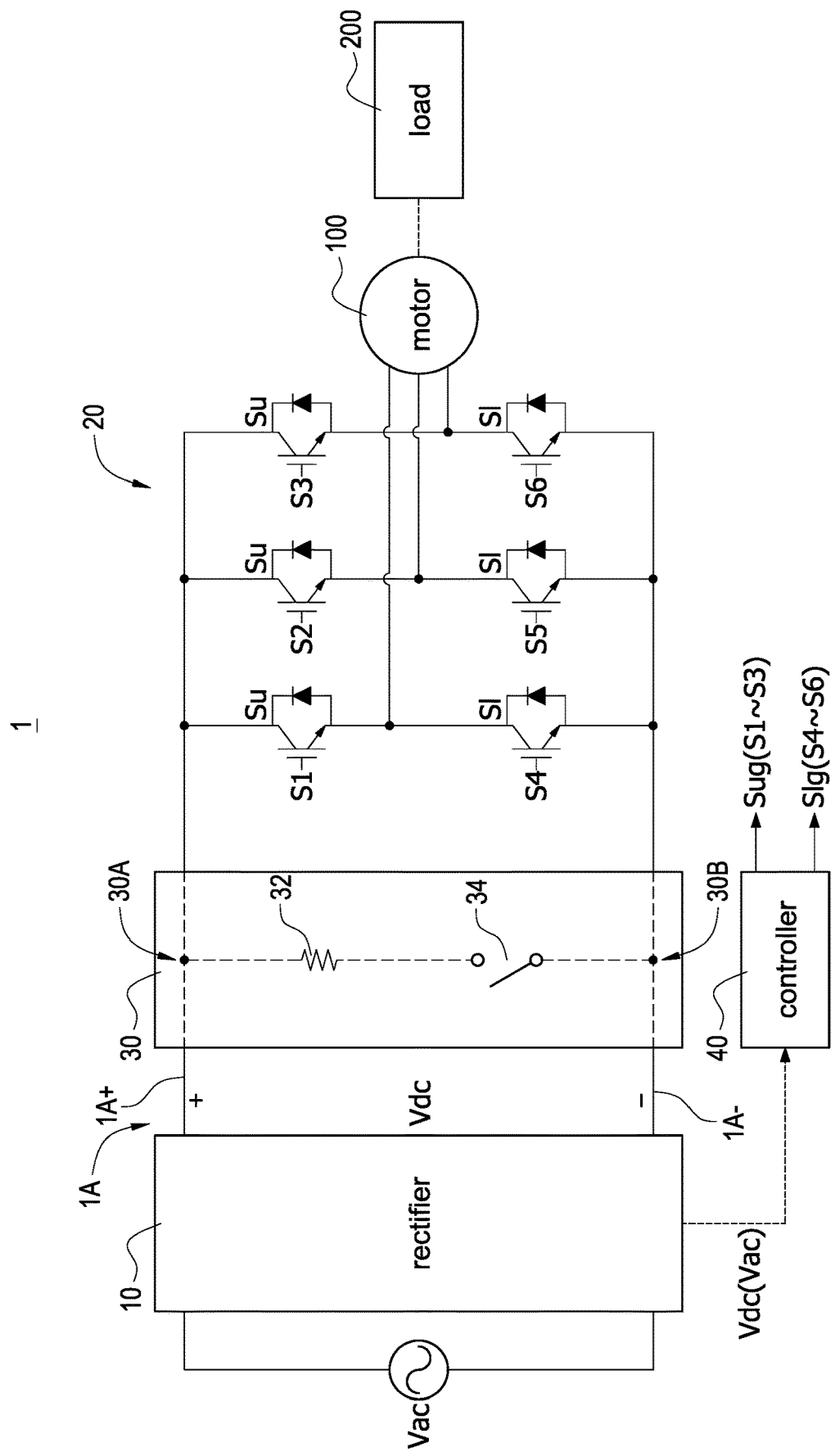
FIG. 1 is a block diagram of a motor control apparatus with a brake function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a motor control apparatus with a brake function according to the present disclosure. The motor control apparatus 1 receives an AC power source Vac to drive a motor 100 to rotate so that the motor 100 drives a load 200, such as but not limited to a belt. The motor control apparatus 1 includes a rectifier 10, an inverter 20, a brake 30, and a controller 40. The rectifier 10 rectifies the AC power source Vac into a DC power source Vdc. The inverter 20 is coupled to the rectifier 10, and receives the DC power source Vdc through a DC terminal 1A. The controller 40 is coupled to the inverter 20, and provides an upper-bridge drive signal assembly Sug (S1-S3) and a lower-bridge drive signal assembly Slg (S4-S6) (such as pulse-width modulation (PWM) signals) according to a feedback (such as an output feedback or an input feedback) of the motor control apparatus 1 to control the inverter 20 to convert the DC power source Vdc into an output power source Vo, and the output power source Vo is provided to rotate the motor 100.

Specifically, the inverter 20 includes a plurality of upper-bridge transistors Su and a plurality of lower-bridge transistors Sl. A switch bridge arm is composed of each upper-bridge transistor Su and the corresponding lower-bridge transistor Sl, and the switch bridge arms are coupled in parallel. The number of switch bridge arms may be determined according to the requirements of the motor 100. For example, but not limited to, three switch bridge arms may be used to control a three-phase motor. In particular, the number of signals of the upper-bridge drive signal assembly Sug including signals S1-S3 corresponds to the number of the upper-bridge transistors Su, and the number of signals of the lower-bridge drive signal assembly Slg including signals S4-S6 corresponds to the number of the lower-bridge transistors Sl. One end of each upper-bridge transistor Su is coupled to a high-voltage terminal 1A+ of the DC terminal 1A, and the other end of each upper-bridge transistor Su is correspondingly coupled to one end of each lower-bridge transistor Sl. The other end of each lower-bridge transistor Sl is coupled to a low-voltage terminal 1A− of the DC terminal 1A. Each phase of the motor 100 is correspondingly coupled to a common node between each upper-bridge transistor Su and each lower-bridge transistor Sl. The controller 40 is respectively coupled to a control end of each upper-bridge transistor Su and a control end of each lower-bridge transistor Sl, and provides the upper-bridge drive signal assembly Sug including signals S1-S3 to control the upper-bridge transistors Su and provides the lower-bridge drive signal assembly Slg including signals S4-S6 to control the lower-bridge transistors Sl.

The brake 30 includes an energy-consuming component 32, a switch component 34, a first terminal 30A, and a second terminal 30B. The first terminal 30A is coupled to the high-voltage terminal 1A+ and the second terminal 30B is coupled to the low-voltage terminal 1A−. The energy-consuming component 32 is coupled between the first terminal 30A and the second terminal 30B through the switch component 34, that is, the energy-consuming component 32 is connected to the switch component 34 in series. The detailed circuit of the brake 30 may include various embodiments, which will be further described later. When the controller 40 determines that the DC power source Vdc is not interrupted, the controller 40 provides the upper-bridge drive signal assembly Sug including signals S1-S3 and the lower-bridge drive signal assembly Slg including signals S4-S6 to control the inverter 20, and the switch component 34 is self-driven turned off to disable the brake 30 so that the controller 40 drives the motor 100 by controlling the inverter 20. When the controller 40 determines that the DC power source Vdc is interrupted, the controller 40 stops controlling the inverter 20, and the switch component 34 is self-driven turned on to activate (enable) the brake 30 so that a back electromotive force generated by the motor 100 is consumed through the energy-consuming component 32 coupled between the first terminal 30A and the second terminal 30B, and the brake 30 brakes the motor 100 to stop rotating.

In one embodiment, the detection of the DC power source Vdc may be implemented by directly detecting an output end of the rectifier 10, or by detecting the AC power source Vac. The controller 40 may by supplied power by the AC power source Vac or the DC power source Vdc indicated as a dashed line with an arrow.

In one embodiment, the motor 100 may be a permanent magnet motor. When the controller 40 stops controlling the inverter 20, the permanent magnet motor will rotate forward to generate the back electromotive force, and the back electromotive force will be fed back to the DC terminal 1A through junction diodes of the upper-bridge transistors Su. Therefore, when the permanent magnet motor brakes, the controller 40 controls the brake 30 to generate a brake path so as to release the back electromotive force generated by the motor 100, thereby producing resistance to the motor 100 and achieving the brake effect.

Figure 2A:
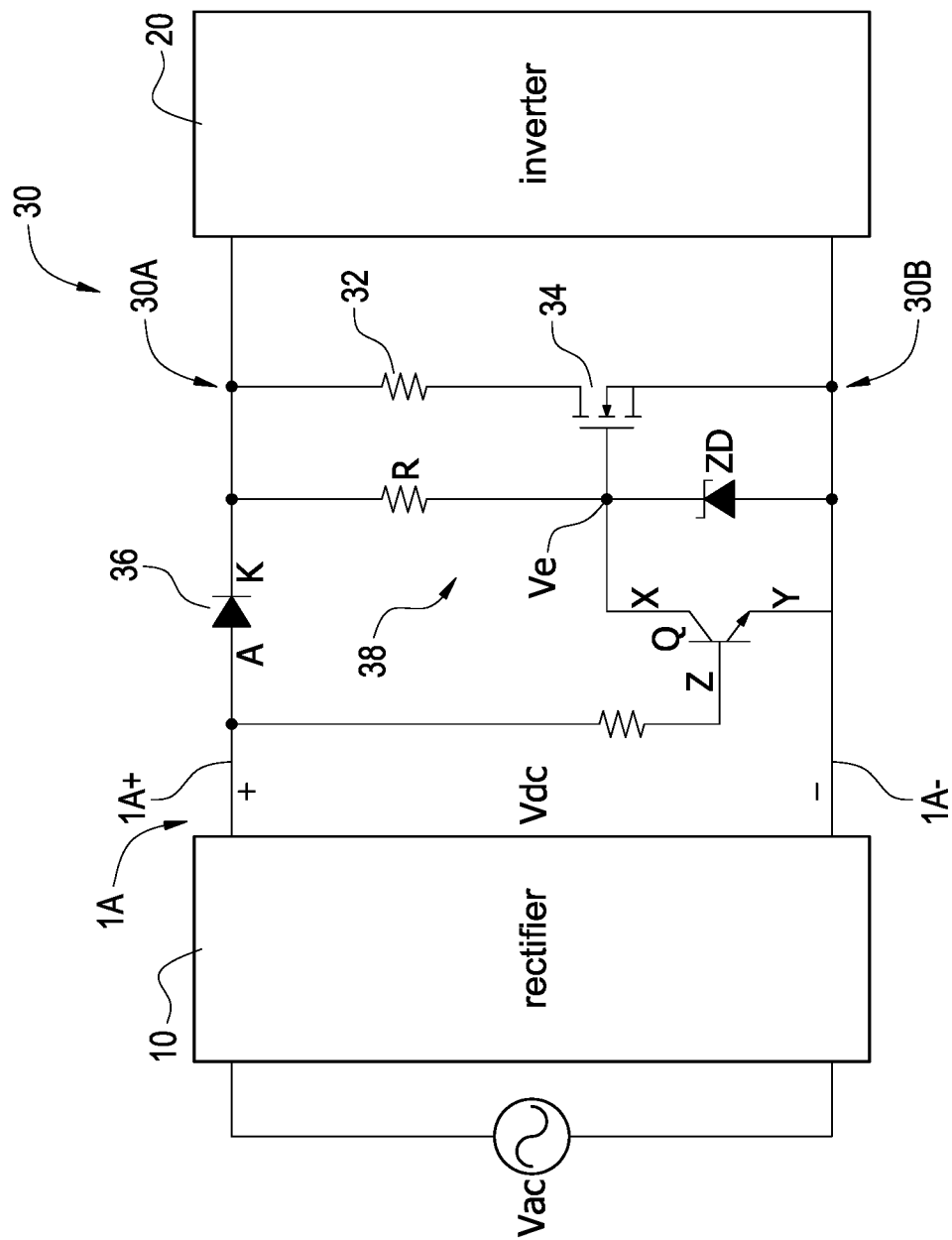
FIG. 2A is a block diagram of a brake according to a first embodiment of the present disclosure.

Please refer to FIG. 2A, which shows a block diagram of a brake according to a first embodiment of the present disclosure, and also refer to FIG. 1. The brake 30 further includes a single-directional turned-on component 36 and a self-driven circuit 38. The single-directional turned-on component 36 has an anode A and a cathode K. The anode A is coupled to the high-voltage terminal 1A+, and the cathode K is coupled to the first terminal 30A. When the back electromotive force exists (is generated) by braking the motor 100, the single-directional turned-on component 36 turns off under reverse bias the back electromotive force so that the back electromotive force is not transmitted to the DC terminal 1A through junction diodes of the upper-bridge transistors Su. The self-driven circuit 38 is coupled to the anode A, the cathode K, the second terminal 30B, and a control end of the switch component 34. The self-driven circuit 38 is used to turn on or turn off the switch component 34 according to the DC power source Vdc. In one embodiment, the switch component 34 may be a transistor. When the DC power source Vdc is not interrupted, the single-directional turned-on component 36 turns on under forward bias, and the switch component 34 is self-driven turned off by the self-driven circuit 38 according to the DC power source Vdc so as to disable the brake 30. When the DC power source Vdc is interrupted, the single-directional turned-on component 36 turns off under reverse bias, and the switch component 34 is self-driven turned on by the self-driven circuit 38 according to the back electromotive force to activate the brake 30 to brake the motor 100. In one embodiment, the single-directional turned-on component 36 may be, for example but not limited to, a diode. Any electronic component, such as a single-directional siliconcontrolled rectifier, a thyristor, and so on, that can be used to provide the single-directional turned-on function should be included in the scope of the present disclosure.

The self-driven circuit 38 includes a transistor Q, a voltage-dividing resistor R, and a voltage-regulating component ZD. The voltage-regulating component ZD may be an electronic component with a function of voltage regulation, such as a Zener diode or a capacitor. The transistor Q has a first end X, a second end Y, and a control end Z. The control end Z is coupled to the anode A and the second end Y is coupled to the second terminal 30B. A first end of the voltage-dividing resistor R is coupled to the cathode K and a second end of the voltage-dividing resistor R is coupled to the first end X and the control end of the switch component 34. A first end of the voltage-regulating component ZD is coupled to the second end of the voltage-dividing resistor R and a second end of the voltage-regulating component ZD is coupled to the second terminal 30B. When the DC power source Vdc is not interrupted, the single-directional turned-on component 36 turns on under forward bias, and the transistor Q is turned on due to the DC power source Vdc. When the transistor Q is turned on, the control end of the switch component 34 is coupled to the low-voltage terminal 1A− so that the switch component 34 is self-driven turned off to disable the brake 30. When the DC power source Vdc is interrupted, the single-directional turned-on component 36 turns off under reverse bias the back electromotive force. At this condition, an enabled voltage Ve at a node between the voltage-dividing resistor R and the voltage-regulating component ZD is generated by the back electromotive force. The switch component 34 is self-driven turned on according to the enabled voltage Ve to activate (enable) the brake 30. In one embodiment, the transistor Q may be, for example but not limited to, different types of semiconductor components such as bipolar junction transistors (BJTs), metal-oxide-semiconductor field-effect transistors (MOSFETs), and insulated gate bipolar transistors (IGBTs).

Since the switch component 34 of the brake 30 is not controlled (turned on or turned off) by any signal generated by a controller, or controlled by a self-designed circuit, or controlled according to the power state at the DC terminal 1A, the switch component 34 is self-driven turned on or self-driven turned off.

Figure 2B:
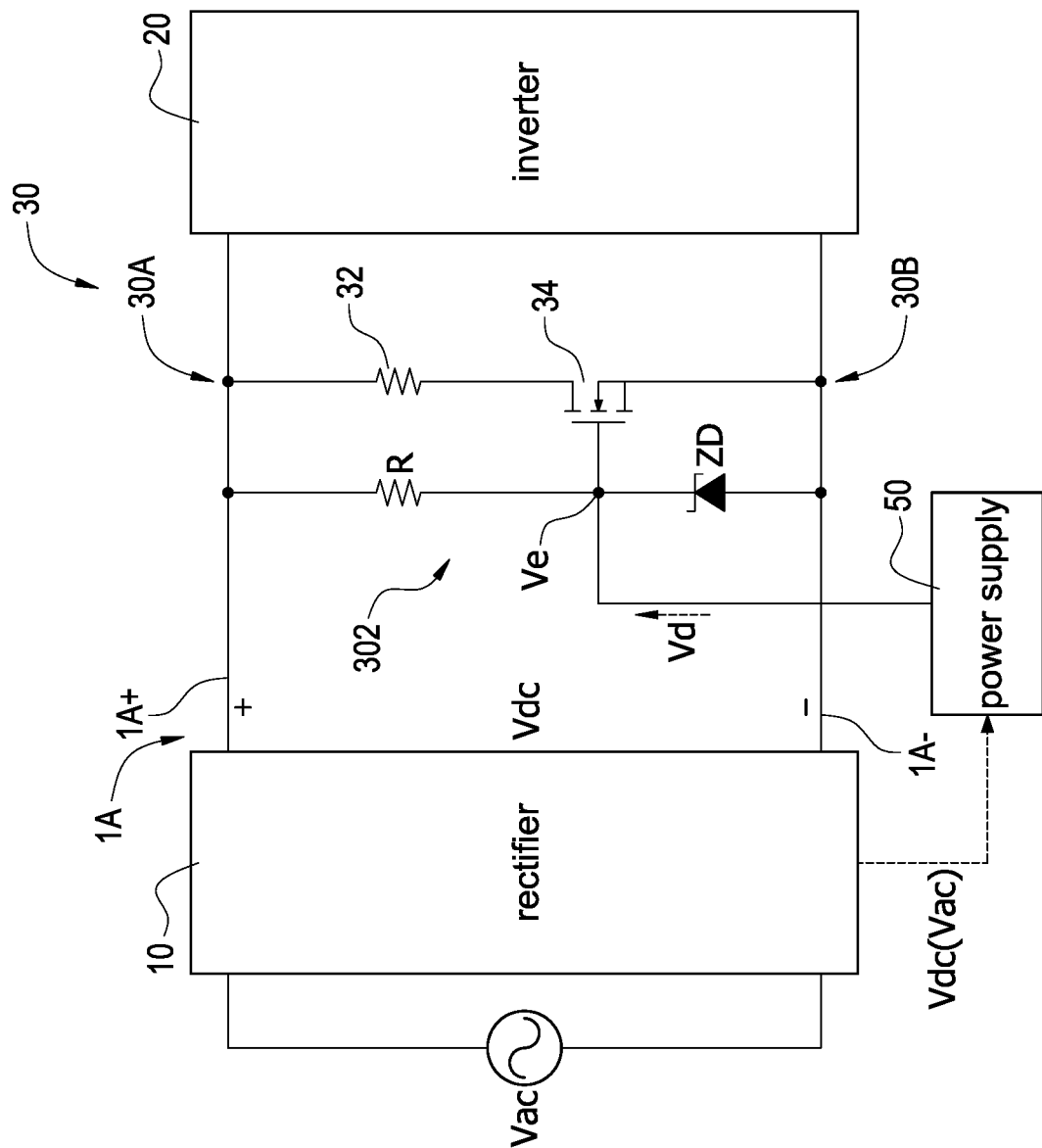
FIG. 2B is a block diagram of the brake according to a second embodiment of the present disclosure.

Please refer to FIG. 2B, which shows a block diagram of the brake according to a second embodiment of the present disclosure, and also refer to FIG. 1 to FIG. 2A. In this embodiment, the motor control apparatus 1 further includes a power supply 50, and the brake 30 includes a voltage-regulating circuit 302. The power supply 50 may receive the AC power source Vac or the DC power source Vdc, and converts the AC power source Vac or the DC power source Vdc into a disabled voltage Vd. The voltage-regulating circuit 302 is coupled to the first terminal 30A, the second terminal 30B, the power supply 50, and the control end of the switch component 34. In one embodiment, the switch component 34 may be, for example but not limited to, different types of semiconductor components such as bipolar junction transistors (BJTs), metal-oxide-semiconductor field-effect transistors (MOSFETs), and insulated gate bipolar transistors (IGBTs). When the DC power source Vdc is not interrupted, the power supply 50 works with power electricity, and converts the AC power source Vac or the DC power source Vdc into the disabled voltage Vd. Since the voltage value of the disabled voltage Vd is designed to turn off the switch component 34, the switch component 34 is self-driven turned off to disable the brake 30. When the DC power source Vdc is interrupted, the power supply 50 does not work without power electricity. At this condition, the voltage-regulating circuit 302 turns on the switch component 34 according to the back electromotive force to activate (enable) the brake 30 to brake the motor 100.

The voltage-regulating circuit 302 includes a voltage-dividing resistor R and a voltage-regulating component ZD. The voltage-regulating component ZD may be an electronic component with a function of voltage regulation, such as a Zener diode or a capacitor. A first end of the voltage-dividing resistor R is coupled to the first terminal 30A and a second end of the voltage-dividing resistor R is coupled to the control end of the switch component 34. A first end of the voltage-regulating component ZD is coupled to the second end of the voltage-dividing resistor R and a second end of the voltage-regulating component ZD is coupled to the second terminal 30B. When the DC power source Vdc is not interrupted, the power supply 50 provides the disabled voltage Vd so that a voltage level at the node between voltage-dividing resistor R and the voltage-regulating component ZD is pulled to the voltage level of the disabled voltage Vd and the switch component 34 cannot be turned on. When the DC power source Vdc is interrupted, the power supply 50 does not work without power electricity. At this condition, the enabled voltage Ve at a node between the voltage-dividing resistor R and the voltage-regulating component ZD is generated by the back electromotive force. The switch component 34 is self-driven turned on according to the enabled voltage Ve to activate (enable) the brake 30.

Figure 2C:
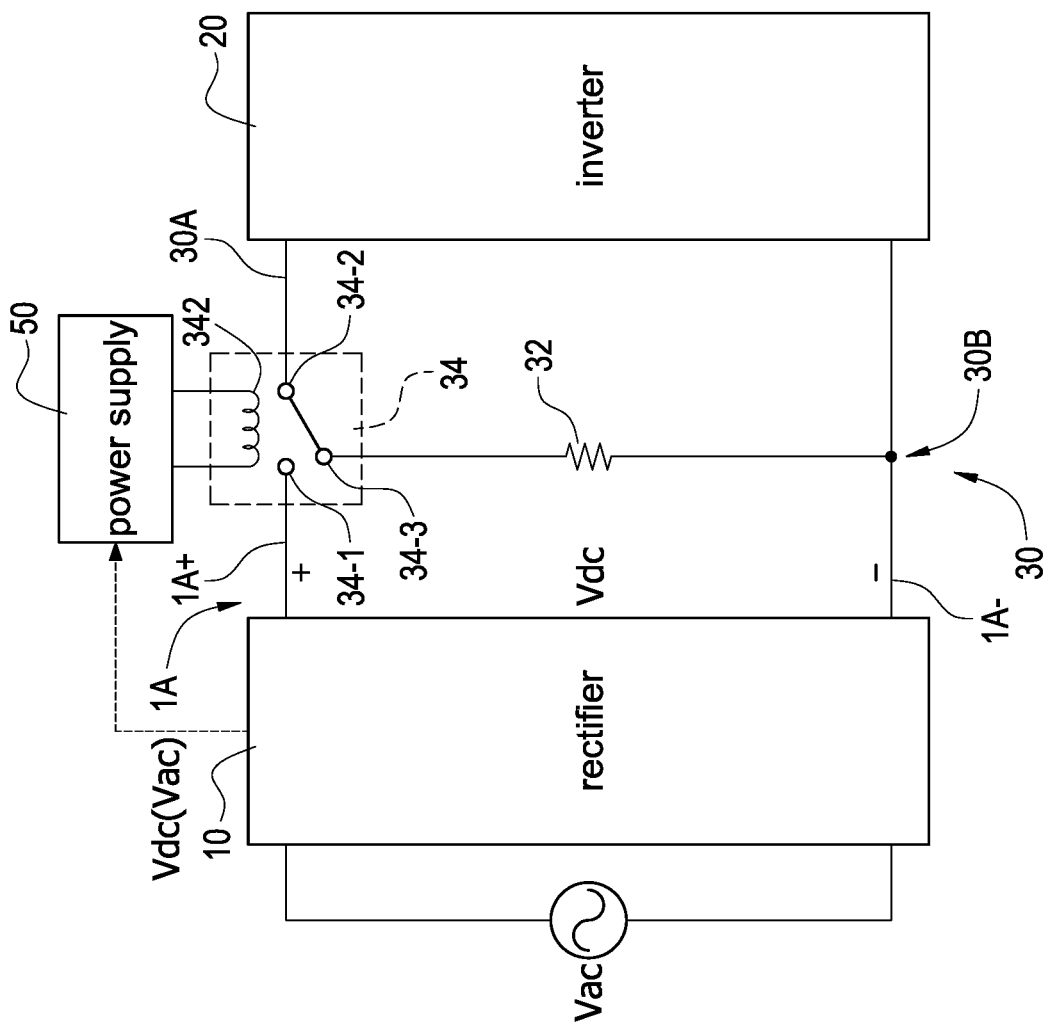
FIG. 2C is a block diagram of the brake according to a third embodiment of the present disclosure.

Please refer to FIG. 2C, which shows a block diagram of the brake according to a third embodiment of the present disclosure, and also refer to FIG. 1 to FIG. 2B. In this embodiment, the motor control apparatus 1 further includes a power supply 50, and the switch component 34 is a three-way switch. The three-way switch includes a first contact 34-1, a second contact 34-2, a third contact 34-3, and a magnet-exciting coil 342. A state between the first contact 34-1 and the second contact 34-2 is normally open, and a state between the second contact 34-2 and the third contact 34-3 is normally closed. The first contact 34-1 is coupled to the high-voltage terminal 1A+, the second contact 34-2 is coupled to the inverter 20, and the third contact 34-3 is coupled to the energy-consuming component 32. The magnet-exciting coil 342 is coupled to the power supply 50. When the first contact 34-1 is coupled to the second contact 34-2, the switch component 34 is in a driven state, and the motor control apparatus 1 can drive the motor 100 to rotate. When the second contact 34-2 is coupled to the third contact 34-3, the switch component 34 is in a brake state, and the motor control apparatus 1 can brake the motor 100 to stop rotating.

When the DC power source Vdc is not interrupted, the power supply 50 works with power electricity, and excites the switch component 34 through the magnet-exciting coil 342. After the switch component 34 is excited by the magnet-exciting coil 342, the first contact 34-1 is coupled to the second contact 34-2 (i.e., the switch component 34 changes to the driven state) to connect a path between the high-voltage terminal 1A+ and the inverter 20. At this condition, the DC power source Vdc is provided to the inverter 20 through the switch component 34. When the DC power source Vdc is interrupted, the power supply 50 does not work without power electricity and does not excite the switch component 34 through the magnet-exciting coil 342. The switch component 34 returns to the normally-closed state that second contact 34-2 is coupled to the third contact 34-3 (i.e., the switch component 34 changes to the brake state) to connect a path between the inverter 20 and the first terminal 30A. At this condition, the back electromotive force is provided to the energy-consuming component 32 through the inverter 20 (junction diodes) and the switch component 34. In one embodiment, the switch component 34 may be connected to the low-voltage terminal 1A−. That is, the first contact 34-1 is coupled to the low-voltage terminal 1A− and the second contact 34-2 is coupled to the second terminal 30B. Although the position of the switch component 34 is opposite to that in previous embodiments, the control manner and the achieved effect are the same, and the detail description is omitted here for conciseness.

Please refer to FIG. 2D, which shows a block diagram of the brake according to a fourth embodiment of the present disclosure, and also refer to FIG. 1 to FIG. 2C. In this embodiment, the switch component 34 is a normally-closed switch. The control end of the switch component 34 is coupled to the DC terminal 1A to receive a voltage signal Sv corresponding to the DC power source Vdc. The voltage signal Sv may be, for example but not limited to, provided to the control end of the switch component 34 by a voltage-dividing manner using voltage-dividing resistors. When the DC power source Vdc is not interrupted, the switch component 34 is self-driven turned off according to the voltage signal Sv with a high level to disable the brake 30. When the DC power source Vdc is interrupted, the voltage signal Sv is low-level, and the switch component 34 returns to the normally-closed state to self-driven turn on to activate the brake 30. In one embodiment, the switch component 34 may be connected to the other side of the energy-consuming component 32, i.e., the side that is close to the high-voltage terminal 1A+. Although the position of the switch component 34 is opposite to that in previous embodiments, the control manner and the achieved effect are the same, and the detail description is omitted here for conciseness.

Figure 3A:
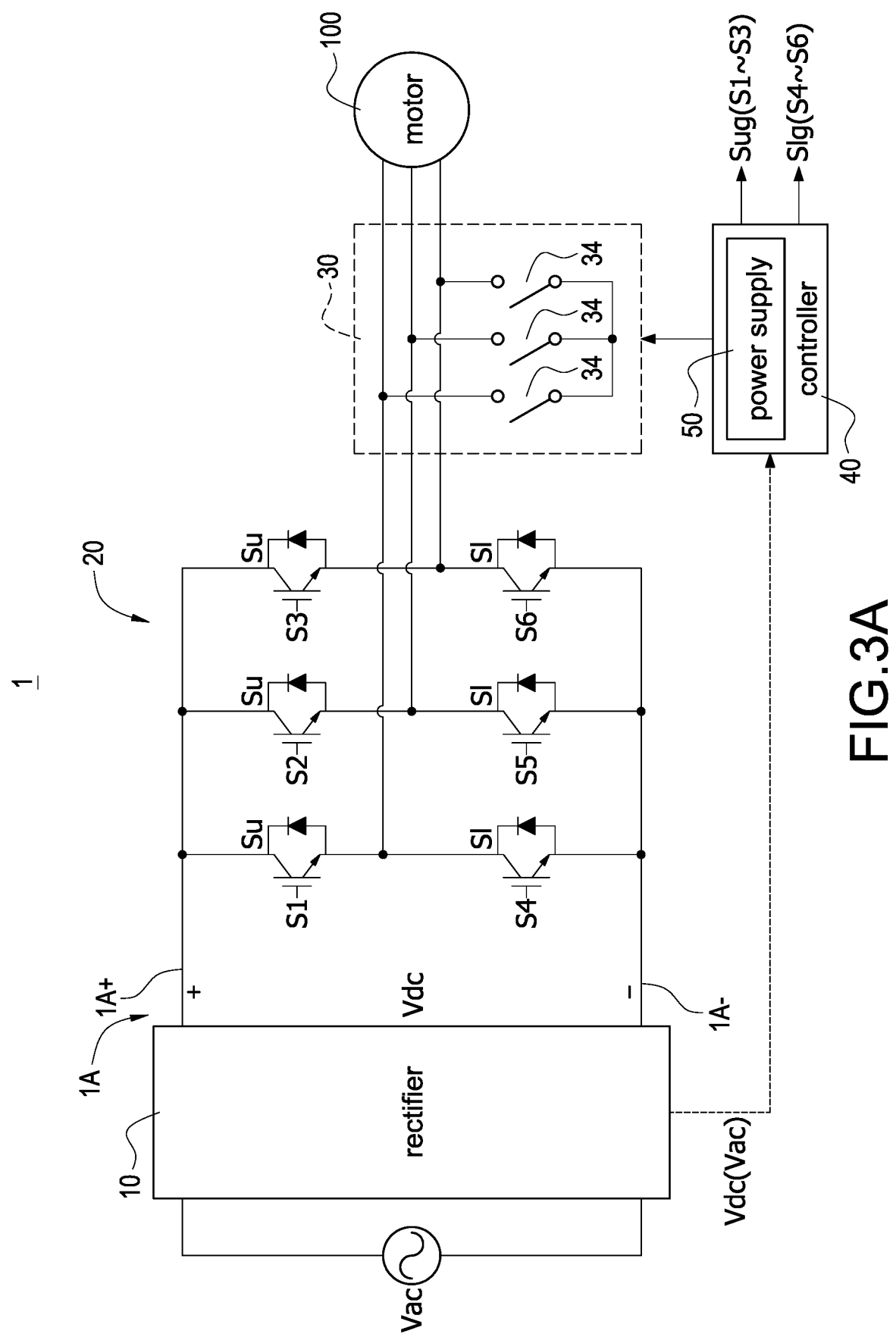
FIG. 3A is a block diagram of the brake according to a first extended embodiment of the present disclosure.
Figure 3B:
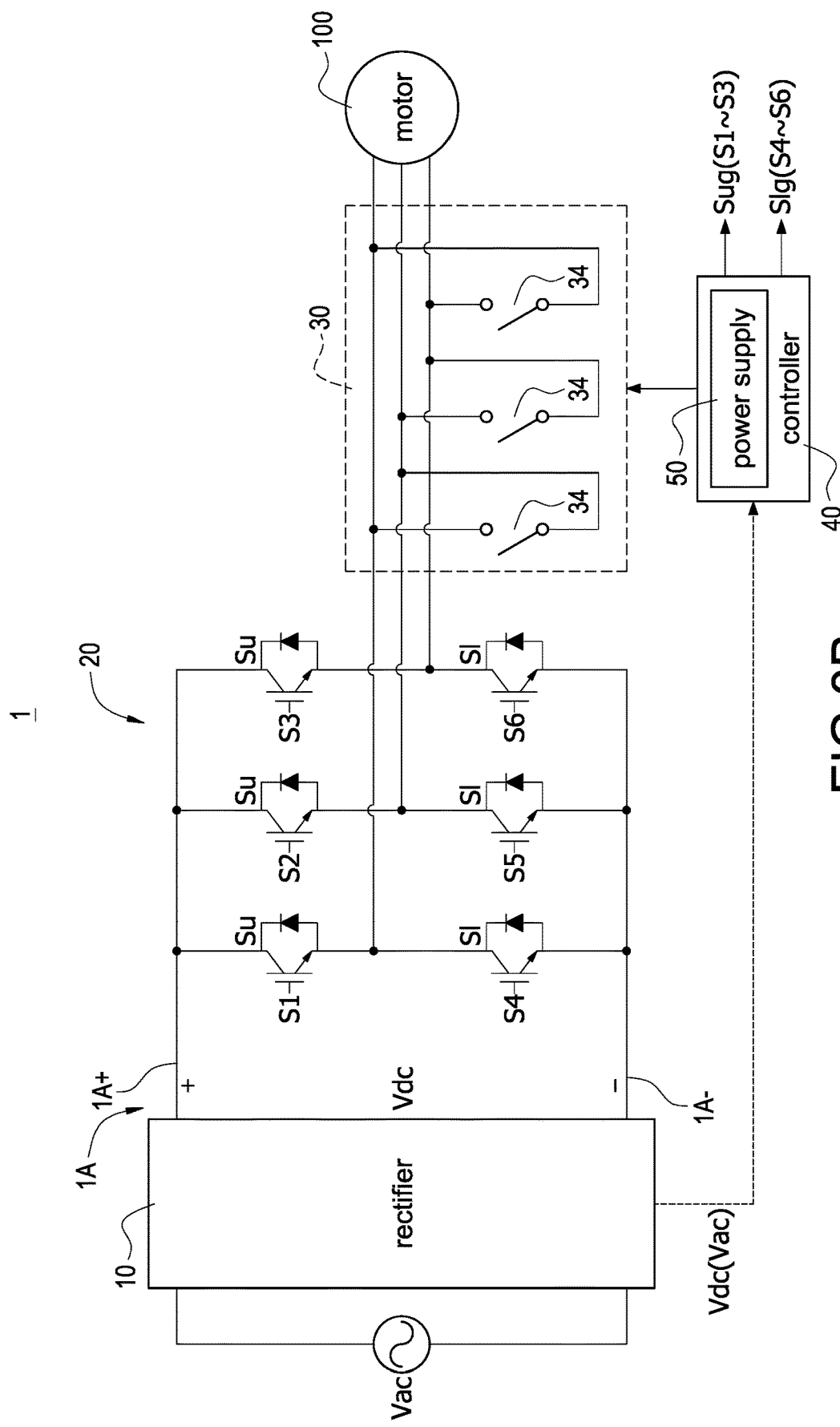
FIG. 3B is a block diagram of the brake according to a second extended embodiment of the present disclosure.

Please refer to FIG. 3A, which shows a block diagram of the brake according to a first extended embodiment of the present disclosure, FIG. 3B, which shows a block diagram of the brake according to a second extended embodiment of the present disclosure, and also refer to FIG. 1 to FIG. 2D. In this embodiment, the brake 30 includes at least one switch component 34, and the number of the switch components 34 is corresponding to the number of phases of the motor 100. The motor control apparatus 1 includes a power supply 50, and the switch component 34 is a normally-closed switch. When the DC power source Vdc is not interrupted, the power supply 50 works with power electricity, and turns off the switch component 34 to disable the brake 30. When the DC power source Vdc is interrupted, the power supply 50 does not work without power electricity. At this condition, the switch component 34 returns to the normally-closed state to be turned on so that the motor 100 is coupled to a neutral point (not shown) through the switch component 34 to activate (enable) the brake 30. When the motor 100 is a three-phase motor, the switch component 34 is a delta-connected structure (shown in FIG. 3A) or a wye-connected structure (shown in FIG. 3B).

Figure 4:
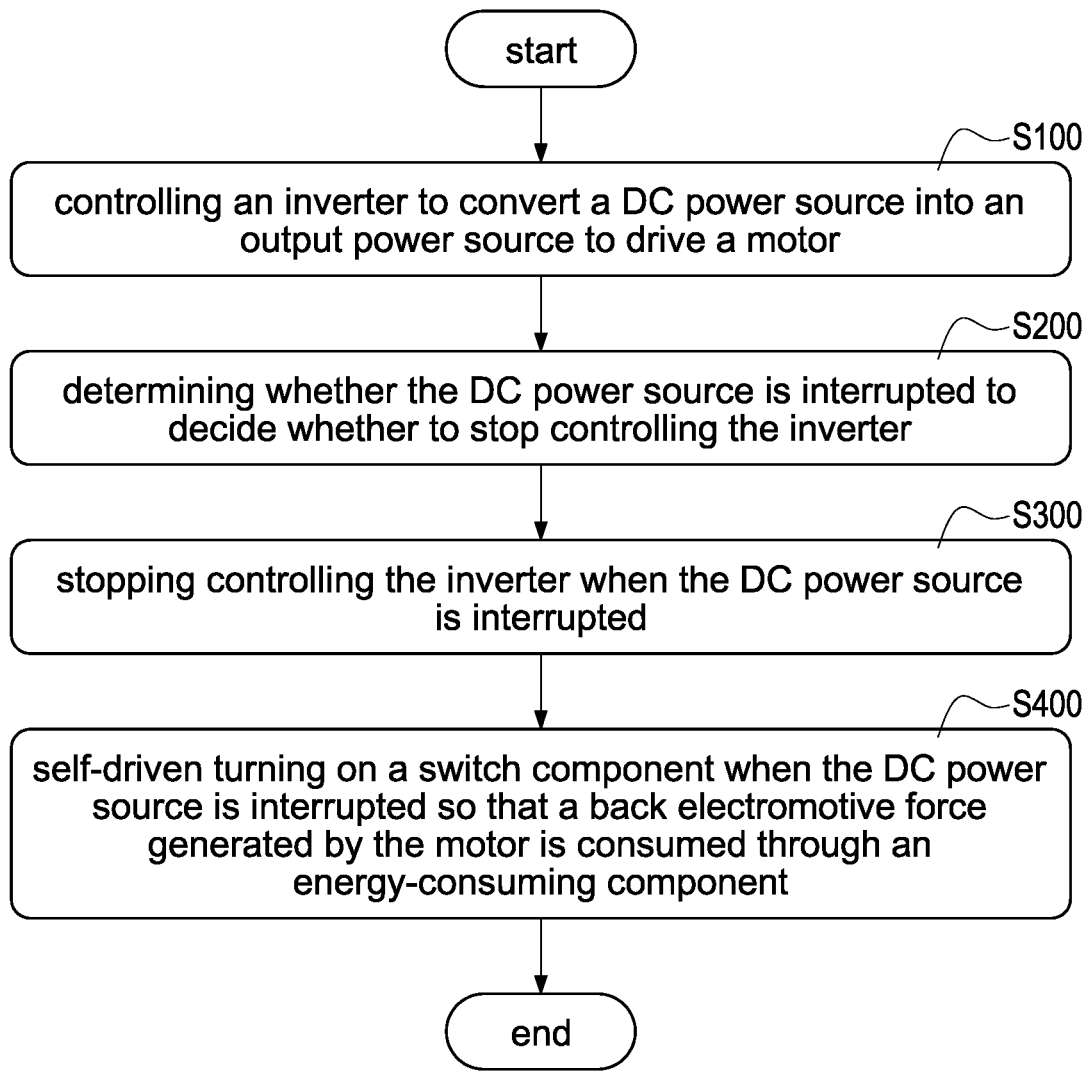
FIG. 4 is a flowchart of a method of controlling the motor control apparatus with the brake function according to the present disclosure.

Please refer to FIG. 4, which shows a flowchart of a method of controlling the motor control apparatus with the brake function according to the present disclosure, and also refer to FIG. 1 to FIG. 3B. The method includes steps of: controlling an inverter to convert a DC power source into an output power source to drive a motor (S100). The controller 40 provides an upper-bridge drive signal assembly Sug and a lower-bridge drive signal assembly Slg (such as pulse-width modulation (PWM) signals) according to a feedback (such as an output feedback or an input feedback) of the motor control apparatus 1 to control the inverter 20 to convert the DC power source Vdc into the output power source Vo, and the output power source Vo is provided to drive the motor 100 to rotate. Afterward, determining whether the DC power source is interrupted to decide whether to stop controlling the inverter (S200). When the controller 40 determines that the DC power source Vdc is not interrupted, the controller 40 provides the upper-bridge drive signal assembly Sug including signals S1-S3 and the lower-bridge drive signal assembly Slg including signals S4-S6 to control the inverter 20. Afterward, stopping controlling the inverter when the DC power source is interrupted (S300).

Finally, self-driven turning on the switch component when the DC power source is interrupted so that a back electromotive force generated by the motor is consumed through the energy-consuming component (S400). When the DC power source Vdc is interrupted, the switch component 34 is self-driven turned on to activate (enable) the brake 30 so that a back electromotive force generated by the motor 100 is consumed through the energy-consuming component 32 coupled between the first terminal 30A and the second terminal 30B, and the brake 30 brakes the motor 100 to stop rotating. In one embodiment, the method shown in FIG. 4 is suitable for the circuit structures shown in FIG. 2A to FIG. 2D. The detailed control manners are different according to the circuit structures shown in FIG. 2A to FIG. 2D. For the detailed control manners, please refer to the related descriptions of FIG. 2A to FIG. 2D accordingly, and the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A motor control apparatus receiving a DC power source through a DC terminal, and coupled to a motor, the motor control apparatus comprising:

a brake comprising an energy-consuming component, a switch component, a first end, and a second end; wherein the first end is coupled to a high-voltage terminal of the DC terminal, and the second end is coupled to a low-voltage terminal of the DC terminal; the energy-consuming component is coupled between the first end and the second end through the switch component, wherein the brake further comprises:

a single-directional turned-on component comprising an anode and a cathode; the anode coupled to the high-voltage terminal and the cathode coupled to the first end of the brake, and a self-driven circuit coupled to the anode, the cathode, the second end of the brake, and a control end of the switch component, wherein when the back electromotive force exists, the single-directional turned-on component turns off under reverse bias the back electromotive force so that the back electromotive force is not transmitted to the DC terminal; the self-driven circuit turns on the switch component according to the back electromotive force when the DC power source is interrupted, and the self-driven circuit turns off the switch component according to the DC power source when the DC power source is not interrupted, an inverter coupled to the first end and the second end, and a controller coupled to the DC terminal, and configured to control the inverter to convert the DC power source to drive the motor, wherein when the controller determines that the DC power source is interrupted, the controller stops controlling the inverter and the switch component is self-driven turned on so that a back electromotive force generated by the motor is consumed through the energy-consuming component, and the brake brakes the motor to stop rotating.

2. The motor control apparatus as claimed in claim 1, wherein the self-driven circuit comprises:

a transistor comprising a first end, a second end, and a control end; the control end coupled to the anode, and the second end coupled to the second end of the brake, a voltage-dividing resistor, a first end of the voltage-dividing resistor coupled to the cathode, and a second end of the voltage-dividing resistor coupled to the first end and the control end of the switch component, and a voltage-regulating component, a first end of the voltage-regulating component coupled to the second end of the voltage-dividing resistor, and a second end of the voltage-regulating component coupled to the second end of the brake, wherein when the DC power source is not interrupted, the transistor is turned on according to the DC power source so that the control end of the switch component is coupled to the low-voltage terminal to be turned off; when the DC power source is interrupted, the control end of the switch component acquires an enabled voltage through a node between the voltage-dividing resistor and the voltage-regulating component so that the switch component is self-driven turned on by the enabled voltage.

3. The motor control apparatus as claimed in claim 1, wherein the switch component is a normally-closed switch, and a control end of the switch component is coupled to the DC terminal; when the DC power source it not interrupted, the normally-closed switch is self-driven turned off; when the DC power source is interrupted, the normally-closed switch is self-driven turned on.

4. A method of operating a motor control apparatus, the motor control apparatus receiving a DC power source through a DC terminal and coupled to a motor; the motor control apparatus comprising a brake and an inverter, the brake comprising an energy-consuming component and a switch component coupled between a high-voltage terminal and a low-voltage terminal of the DC terminal, the method comprising steps of:

controlling the inverter to convert the DC power source into an output power source to drive the motor, determining whether the DC power source is interrupted to decide whether to stop controlling the inverter, stopping controlling the inverter when the DC power source is interrupted, and self-driven turning on the switch component when the DC power source is interrupted so that a back electromotive force generated by the motor is consumed through the energy-consuming component, and the brake brakes the motor to stop rotating, wherein the brake further includes a single-directional turned-on component and a self-driven circuit, the method further comprises steps of:

turning off the switch component by the self-driven circuit according to the DC power source when the DC power source is not interrupted, and turning off under reverse bias the back electromotive force by the single-directional turned-on component when the back electromotive force exists so that the back electromotive force is not transmitted to the DC terminal, and generating an enabled voltage by the self-driven circuit according to the back electromotive force to turn on the switch component by the enabled voltage.

5. The method of operating the motor control apparatus as claimed in claim 4, the motor control apparatus further comprising a power supply, and the brake further comprising a voltage-regulating circuit, the method further comprises steps of:

turning off the switch component by the power supply according to the DC power source when the DC power source is not interrupted, and generating an enabled voltage by the voltage-regulating circuit according to the back electromotive force when the DC power source is interrupted to turn on the switch component by the enabled voltage.

6. The method of operating the motor control apparatus as claimed in claim 4, the motor control apparatus further comprising a power supply, and the switch component selectively switched to a driven state and a brake state, the method further comprises steps of:

controlling the switch component to switch to the driven state when the DC power source is not interrupted and the power supply works with power electricity so that the inverter is coupled to the DC terminal through the switch component, and controlling the switch component to switch to the brake state when the DC power source is interrupted and the power supply does not work without power electricity so that the inverter is coupled to the energy-consuming component through the switch component.

7. The method of operating the motor control apparatus as claimed in claim 4, the motor control apparatus further comprising a power supply, and the switch component being a normally-closed switch, the method further comprises steps of:

self-driven turning off the normally-closed switch according to the DC power source when the DC power source is not interrupted, and self-driven turning on the normally-closed switch under a normally-closed state when the DC power source is interrupted.

8. A motor control apparatus receiving a DC power source through a DC terminal, and coupled to a motor, the motor control apparatus comprising:

a brake comprising an energy-consuming component, a switch component, a first end, and a second end; wherein the first end is coupled to a high-voltage terminal of the DC terminal, and the second end is coupled to a low-voltage terminal of the DC terminal; the energy-consuming component is coupled between the first end and the second end through the switch component, an inverter coupled to the first end and the second end, a controller coupled to the DC terminal, and configured to control the inverter to convert the DC power source to drive the motor, and a power supply coupled between the DC terminal and a control end of the switch component, and the brake further comprising:

a voltage-regulating circuit coupled to the first end of the brake, the second end of the brake, the power supply, and the control end of the switch component, wherein the voltage-regulating circuit comprises:
a voltage-dividing resistor, a first end of the voltage-dividing resistor coupled to the first end of the brake, and a second end of the voltage-dividing resistor coupled to the control end of the switch component, and
a voltage-regulating component, a first end of the voltage-regulating component coupled to the second end of the voltage-dividing resistor, and a second end of the voltage-regulating component coupled to the second end of the brake,
wherein when the DC power source is interrupted, the control end of the switch component acquires an enabled voltage through a node between the voltage-dividing resistor and the voltage-regulating component so that the switch component is self-driven turned on by the enabled voltage,
wherein when the DC power source is interrupted, the voltage-regulating circuit turns on the switch component according to the back electromotive force, and the power supply turns off the switch component according to the DC power source when the DC power source is not interrupted,
wherein when the controller determines that the DC power source is interrupted, the controller stops controlling the inverter and the switch component is self-driven turned on so that a back electromotive force generated by the motor is consumed through the energy-consuming component, and the brake brakes the motor to stop rotating.

* * * * *